US007795572B2

(12) United States Patent
Jung et al.

(10) Patent No.: US 7,795,572 B2
(45) Date of Patent: Sep. 14, 2010

(54) OPTICAL POINTING DEVICE WITH SHUTTER CONTROL

(75) Inventors: Duck-Young Jung, Yongin-si (KR); Bang-Won Lee, Yongin-si (KR)

(73) Assignee: Atlab Inc. (KR)

( * ) Notice: Subject to any disclaimer, the term of this patent is extended or adjusted under 35 U.S.C. 154(b) by 125 days.

(21) Appl. No.: 12/125,980

(22) Filed: May 23, 2008

(65) Prior Publication Data

US 2009/0289171 A1    Nov. 26, 2009

(51) Int. Cl.
*H01L 27/00*  (2006.01)
*G06M 7/00*  (2006.01)
(52) U.S. Cl. .................................. 250/208.1; 250/221
(58) Field of Classification Search .............. 250/208.1, 250/208.6, 221, 206, 206.1, 214 R, 214.1, 250/227.13; 382/103, 107; 345/163, 166, 345/157, 165; 348/296, 222.1, 229.1
See application file for complete search history.

(56) References Cited

U.S. PATENT DOCUMENTS

| 2003/0102425 | A1* | 6/2003 | Rotzoll et al. | 250/221 |
| 2004/0109074 | A1* | 6/2004 | Jung | 348/308 |
| 2005/0161582 | A1* | 7/2005 | Lee et al. | 250/205 |

FOREIGN PATENT DOCUMENTS

| JP | 2002-175149 | 6/2002 |
| JP | 2003-076486 | 3/2003 |
| JP | 2006-260574 | 9/2006 |
| KR | 10-2004-0049233 | 6/2004 |

OTHER PUBLICATIONS

Office Action issued by Korean Intellectual Property Office on Jun. 27, 2008.

* cited by examiner

*Primary Examiner*—Thanh X Luu
*Assistant Examiner*—Jennifer Bennett
(74) *Attorney, Agent, or Firm*—Cantor Colburn LLP

(57) ABSTRACT

An optical pointing device is provided. The optical pointing device includes an image sensor including a photocell array including a plurality of photocells for sensing light and generating an analog signal corresponding to the light, the image sensor sequentially outputting analog signals from the plurality of photocells, a comparator for comparing the signals output from the image sensor to generate a relative comparative signal, and comparing at least one signal output from the image sensor with a comparative signal to generate an absolute comparative signal, and a controller for outputting motion data using the relative comparative signal and outputting a shutter control signal using the absolute comparative signal. The optical pointing device does not include an A/D converter or a pre-filter circuit, thus reducing a chip size of a semiconductor integrated circuit, unlike a conventional optical pointing device. Furthermore, the optical pointing device can obtain high-quality image data and accordingly accurate motion data of an object, by using the comparator having the offset removal and the offset correction circuit external to the image sensor. Also, the use of the second photocell separate from the image sensor can reduce data computational complexity of the shutter control signal controller in the image processor, thus reducing current consumption in the image processor.

12 Claims, 10 Drawing Sheets

OPTICAL POINTING DEVICE WITH SHUTTER CONTROL

BACKGROUND OF THE INVENTION

1. Field of the Invention

The present invention relates to an optical pointing device, and more particularly, to a device for obtaining motion data of an object using an image sensor.

2. Description of the Related Art

In general, an image sensor is an optical conversion device including a plurality of photocells, each converting reflected light from an object into an electrical signal corresponding to its intensity.

An optical pointing device converts signals of the above photocells, i.e., electrical signals corresponding to intensities of reflected light from an object into image data for the object through a series of signal processing procedures, compares current image data of the object with previous image data, and calculates and outputs motion data of the object.

FIG. 1 is a block diagram of a conventional optical pointing device. The optical pointing device includes an image sensor 11, an A/D converter 12, a pre-filter circuit 13, an image processor 14, and a shutter control circuit 15.

Respective functions of the blocks shown in FIG. 1 will now be described.

A light source (not shown) for emitting light and a light-source control circuit (not shown) for controlling the light source adjust an amount of the emitted light and illuminate an object (not shown) with the light.

The image sensor 11 includes a pixel array (not shown) for detecting light reflected by the object and outputting an electrical analog signal PSA corresponding to the amount of the light.

The A/D converter 12 receives the electrical analog signal PSA from the image sensor 11 and outputs a digital signal PSAD.

The shutter control circuit 15 receives the output signal PSAD from the A/D converter 12 and outputs a shutter control signal CSH for controlling an electronic shutter (not shown) in the image sensor. The shutter control signal CSH maintains a signal average value of the pixel array of the image sensor at a certain level.

The pre-filter circuit 13 receives the output signal PSAD from the A/D converter 12, and converts the output signal PSAD into 1-bit data, i.e., minimal data structure essential for motion detection according to a predetermined rule.

The predetermined rule may generally be an edge detection algorithm.

The image processor 14 receives an output signal DSO of the pre-filter circuit, and calculates and outputs motion data Vk of the object.

The conventional optical pointing device shown in FIG. 1 necessarily includes the A/D converter 12 and the pre-filter circuit 13 which increase a layout area of the optical pointing device, and in turn, increase a chip size of a semiconductor integrated circuit.

FIG. 2 is a block diagram of another conventional optical pointing device. The conventional optical pointing device includes an image sensor 21, an image processor 24, and a shutter control circuit 25.

Respective functions of the blocks shown in FIG. 2 will now be described.

The image sensor 21 detects light, converts the light into an electrical analog signal corresponding to an amount of the light, and outputs the electrical analog signal as a 1-bit digital signal ISO.

The image processor 24 receives the output signal ISO of the image sensor 21, and derives and outputs motion data Vk of an object. The image processor 24 also outputs a shutter data signal IPO to provide the shutter control circuit 25 and a pixel select signal PS for selecting pixels to provide the image sensor 21.

The shutter control circuit 25 receives the shutter data signal IPO from the image processor 24, and outputs a shutter control signal CSH for controlling an electronic shutter (not shown) in the image sensor 21. That is, the shutter control circuit 25 outputs the shutter control signal CSH for maintaining a signal average value of a pixel array (not shown) in the image sensor 21 at a certain level in response to the shutter data signal IPO.

FIG. 3 is a block diagram of the image sensor of the conventional optical pointing device of FIG. 2.

Referring to FIG. 3, the image sensor 21 includes a plurality of unit pixels 36 to 39. Each of the unit pixels 36 to 39 includes a photocell PC1, a comparator COMP1, and a switch SW1.

The photocell PC1 receives light and generates an analog voltage corresponding to an amount of the light. In response to the shutter control signal CSH, the comparator COMP1 compares an output signal PC001 of the photocell PC1 with an output signal PC002 of the photocell PC2 in the adjacent unit pixel 37 and outputs a 1-bit digital signal COM01.

In this case, a comparator COMP N in a last unit pixel 39 uses any reference voltage VREF1 as a reference voltage.

In response to the pixel select signal PS, the switch SW1 outputs the 1-bit digital signal COM01 from the comparator COMP1 as the output signal ISO of the image sensor 21.

The problem associated with the conventional optical pointing device as shown in FIG. 1 is resolved by using the image sensor 21 including the comparator COMP and the switch SW as shown in FIG. 3. However, in the image sensor 21 of the optical pointing device shown in FIG. 2, inclusion of the comparator COMP and the switch SW in the unit photocells 36 to 39 has a limitation of decreasing the unit photocell size and can not compensate for an offset of each of the photocells PC1 to PC(N) in the unit photocells 36 to 39.

SUMMARY OF THE INVENTION

The present invention provides an optical pointing device capable of reducing a chip size of a semiconductor integrated circuit.

The present invention also provides an optical pointing device capable of obtaining a high-quality image output and outputting accurate motion data using a comparator having an offset removal and an offset correction circuit external to an image sensor.

According to an aspect of the present invention, an optical pointing device comprises: an image sensor including a photocell array including a plurality of photocells for sensing light and generating an analog signal corresponding to the light, the image sensor sequentially outputting analog signals from the plurality of photocells; a comparator for comparing the signals output from the image sensor to generate a relative comparative signal, and comparing at least one signal output from the image sensor with a comparative signal to generate an absolute comparative signal; and a controller for outputting motion data using the relative comparative signal and outputting a shutter control signal using the absolute comparative signal.

The image sensor may comprise the plurality of photocells arranged in a first direction and a second direction; a photocell-line selection circuit for selecting the plurality of photocells arranged in the first direction in response to a first control signal; and a switch circuit for selecting and outputting analog signals output from the plurality of photocells selected by the photocell-line selection circuit in response to a second control signal.

The controller may comprise a motion data output unit for receiving the relative comparative signal, and calculating and outputting motion data; and a shutter control signal controller for receiving the absolute comparative signal, calculating an average value of the signal, and outputting a shutter control signal, wherein the controller outputs the first control signal for controlling the photocell-line selection circuit of the image sensor, and the second control signal for controlling the switch circuit of the image sensor.

The comparator may comprise at least one first comparator for comparing at least two analog signals output from the switch circuit and outputting the relative comparative signal; and at least one second comparator for comparing at least one analog signal output from the switch circuit with the comparative signal and outputting the absolute comparative signal.

The comparator may further comprise an offset correction circuit for correcting an offset of the first comparator itself; and an offset removal circuit for removing an offset of the signal output from the switch circuit.

The offset correction circuit may comprise an offset correction circuit using a switched-capacitor scheme to perform offset correction.

The offset removal circuit may comprise an offset removal circuit using a correlated double sampling scheme to remove the offset.

According to another aspect of the present invention, an optical pointing device comprises: an image sensor including a photocell array including a plurality of first photocells for sensing light and generating an analog signal corresponding to the light, the image sensor sequentially outputting analog signals output from the plurality of first photocells; at least one second photocell for sensing light and generating an analog signal corresponding to the light; a comparator for comparing the signals output from the image sensor to generate a relative comparative signal and comparing the signal output from the second photocell with a comparative signal to generate an absolute comparative signal; and a controller for outputting motion data using the relative comparative output signal and outputting a shutter control signal using the absolute comparative output signal.

The image sensor may comprise the plurality of photocells arranged in a first direction and a second direction; a photocell-line selection circuit for selecting the plurality of photocells arranged in the first direction in response to a first control signal; and a switch circuit for selecting and outputting analog signals output from the plurality of photocells selected by the photocell-line selection circuit in response to a second control signal.

The controller may comprise a motion data output unit for receiving the relative comparative signal, and calculating and outputting motion data; and a shutter control signal controller for receiving the absolute comparative signal, calculating an average value of the signal, and outputting a shutter control signal, wherein the controller outputs the first control signal for controlling the photocell-line selection circuit of the image sensor, and the second control signal for controlling the switch circuit of the image sensor.

The comparator may comprise at least one first comparator for comparing at least two analog signals output from the switch circuit and outputting the relative comparative signal; and at least one second comparator for comparing the analog signal output from the second photocell with the comparative signal and outputting the absolute comparative signal.

The comparator may further comprise an offset correction circuit for correcting an offset of the first comparator itself; and an offset removal circuit for removing an offset of the analog signal output from the switch circuit.

The offset correction circuit may comprise an offset correction circuit using a switched-capacitor scheme to perform offset correction.

The offset removal circuit may comprise an offset removal circuit using a correlated double sampling scheme to remove the offset.

BRIEF DESCRIPTION OF THE DRAWINGS

The foregoing and other objects, features and advantages of the invention will be apparent from the more particular description of an embodiment of the invention, as illustrated in the accompanying drawings. The drawings are not necessarily to scale, emphasis instead being placed upon illustrating the principles of the invention.

DETAILED DESCRIPTION OF EXEMPLARY EMBODIMENTS

Hereinafter, an optical pointing device according to the present invention will be described with reference to the accompanying drawings.

Figure 1:
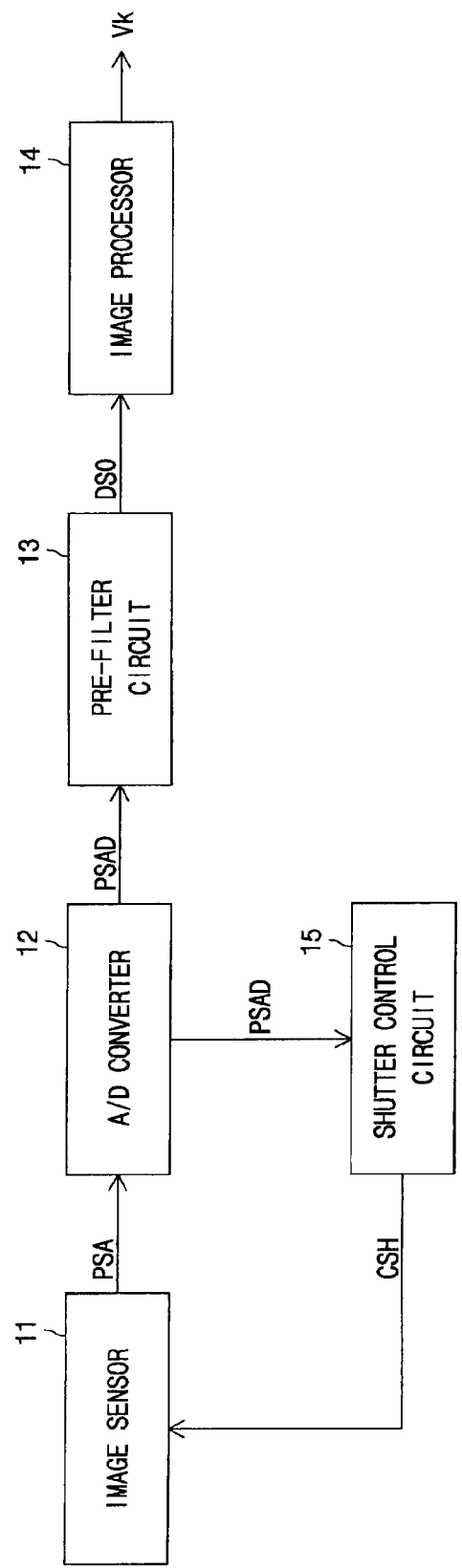
FIG. 1 is a block diagram of a conventional optical pointing device.
Figure 2:
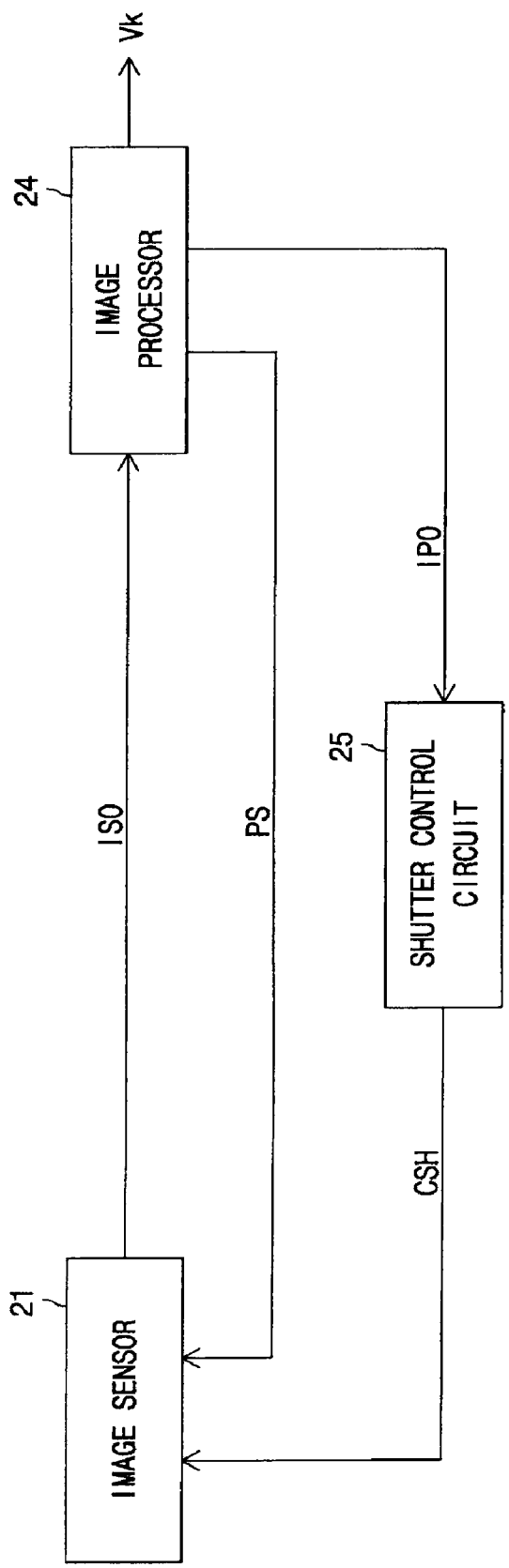
FIG. 2 is a block diagram of another conventional optical pointing device.
Figure 3:
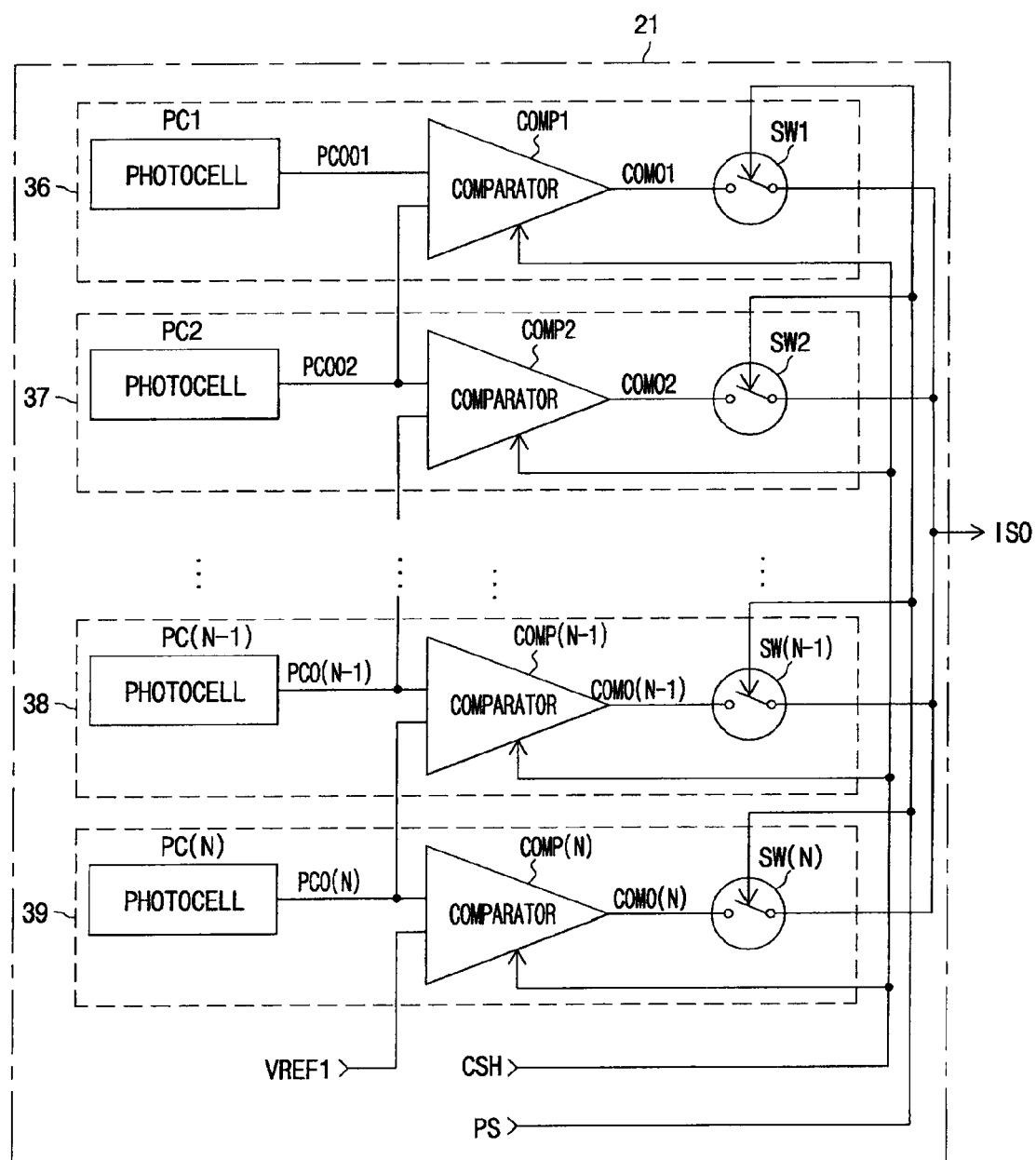
FIG. 3 is a block diagram of an image sensor of FIG. 2.
Figure 4:
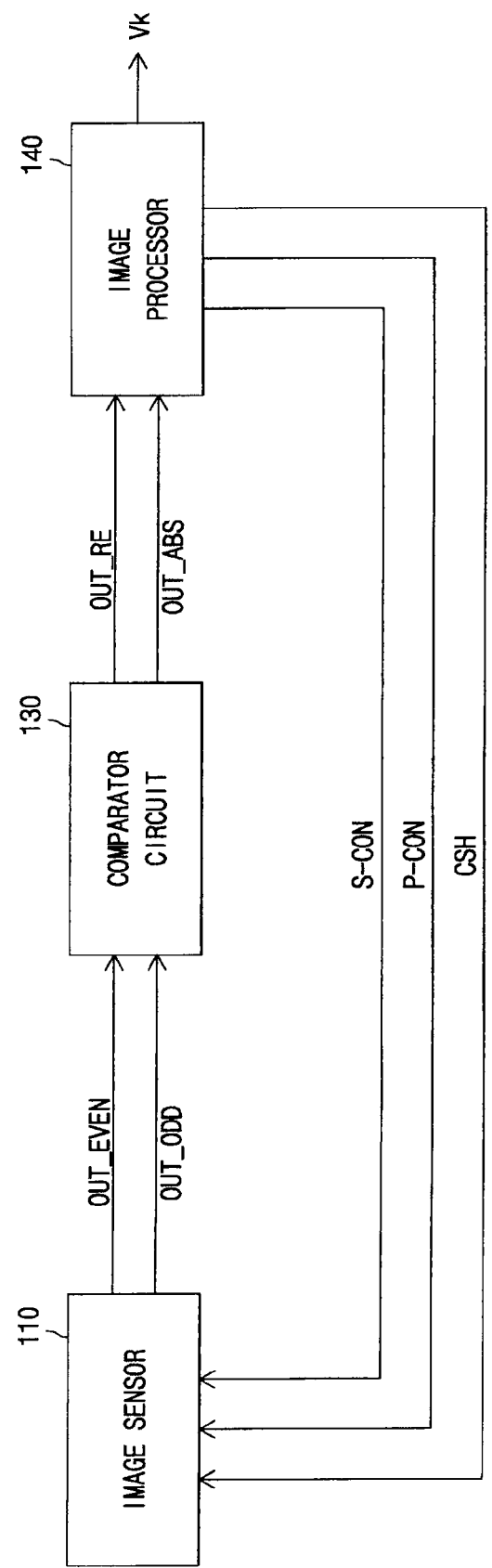
FIG. 4 is a block diagram of an optical pointing device according to the present invention.

FIG. 4 is a block diagram of an optical pointing device according to the present invention. The optical pointing device includes an image sensor 110, a comparator circuit 130, and an image processor 140.

Respective functions of the blocks shown in FIG. 4 will now be described.

A light source (not shown) for emitting light and a light-source control circuit (not shown) for controlling the light source adjust an amount of the emitted light and illuminate an object (not shown) with the light.

The image sensor 110 detects light reflected by the object, converts the light into an electrical analog signal corresponding to an amount of the light, and outputs electrical analog signals OUT_EVEN and OUT_ODD generated by a plurality of photocells (not shown) in the image sensor 110.

The comparator circuit 130 compares the analog signals OUT_EVEN and OUT_ODD output from the image sensor 110 and outputs digital signals, i.e., a relative comparative output signal OUT_RE and an absolute comparative output signal OUT_ABS.

The image processor 140 receives the relative comparative output signal OUT_RE and the absolute comparative output signal OUT_ABS from the comparator circuit 130, derives and outputs motion data Vk of the object. The image processor 140 also outputs control signals S-CON, P-CON, and CSH for controlling the image sensor 110.

Figure 5:
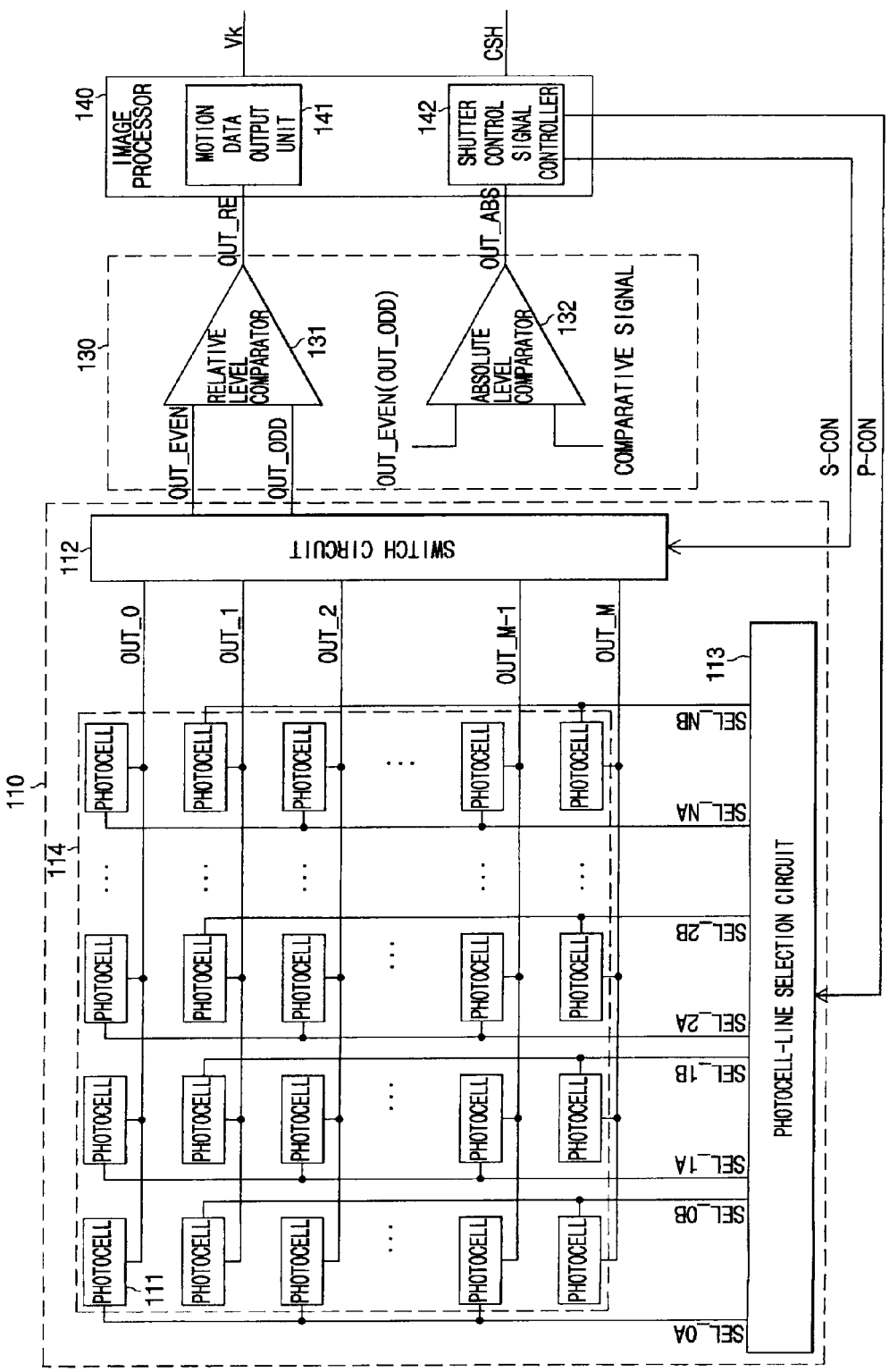
FIG. 5 illustrates an optical pointing device according to a first embodiment of the present invention.

FIG. 5 illustrates an optical pointing device according to a first embodiment of the present invention. The optical pointing device includes an image sensor 110, a comparator circuit 130, and an image processor 140.

Respective functions of the blocks shown in FIG. 5 will now be described.

A light source (not shown) for emitting light and a light-source control circuit (not shown) for controlling the light source adjust an amount of the emitted light and illuminate an object (not shown) with the light.

The image sensor 110 includes a photocell array 114, a photocell-line selection circuit 113, and a switch circuit 112. In the photocell array 114, each photocell 111 generates an electrical analog signal corresponding to an amount of accumulated light.

In response to a control signal P-CON from the image processor 140, the photocell-line selection circuit 113 selects photocell select lines SEL_0A to SEL_NA and SEL_0B to SEL_NB connected to the plurality of photocells on column lines of the photocell array, and opens output lines of the photocells connected to the selected photocell select lines.

The switch circuit 112 selects by two of a plurality of opened output lines OUT_0 to OUT_M in response to a control signal S-CON from the image processor 140.

The comparator circuit 130 includes a relative level comparator 131 and an absolute level comparator 132. The relative level comparator 131 compares the two signals OUT_EVEN and OUT_ODD output from the switch circuit 112 and outputs a 1-bit relative comparative output signal OUT_RE.

The absolute level comparator 132 compares a comparative signal (i.e., a voltage at a predetermined level) with the output signal of the switch circuit 112 and outputs a 1-bit absolute comparative output signal OUT_ABS.

The image processor 140 includes a motion data output unit 141 and a shutter control signal controller 142 and outputs the control signal P-CON to the photocell-line selection circuit 113 and the control signal S-CON to the switch circuit 112. The motion data output unit 141 outputs a motion data signal Vk in response to the output signal OUT_RE of the relative level comparator 131. The shutter control signal controller 142 outputs the shutter control signal CSH for controlling an electronic shutter (not shown) of the image sensor 110 in response to the output signal OUT_ABS of the absolute level comparator 132.

Although the light source for emitting the light and the light-source controller (not shown) for controlling the light source of the optical pointing device are not shown, the image signal of the object from the photocells 111 can be output as a clearer image signal through a light-source controller such as the shutter control signal controller 142.

Operation of the optical pointing device will be described using the description of the functions of the blocks in the optical pointing device shown in FIG. 5.

In the image sensor 110, the plurality of photocells 111 generate an electrical analog signal corresponding to the amount of the light reflected by the object.

The photocell-line selection circuit 113 in the image sensor 110 outputs a line select signal in response to the control signal P-CON from the image processor 140 to select two of the plurality of photocell select lines SEL_0A to SEL_NA. The plurality of photocell output lines OUT_0 to OUT_M connected to the selected photocell select lines SEL_0A and SEL_0B are opened.

In this case, only one photocell 111 is connected to each photocell output line OUT_0 of the plurality of opened photocell output lines OUT_0 to OUT_M so that the analog signal from the photocell 111 is output. The photocell select lines SEL_0A to SEL_NA and SEL_0B to SEL_NB may be selected by the pre-filter rule. Alternatively, they may be selected randomly or sequentially. The pre-filter rule is determined by a designer's intention. However, in an exemplary embodiment of the present invention, the photocell select lines are described as being sequentially selected by the pre-filter rule. Switching is made from the selected photocell select lines SEL_0A and SEL_0B to other select lines SEL_1A and SEL_1B after the output from all the photocells selected by the switch circuit 112 ends. It will be easily appreciated that the pre-filter rule and the wirings between the photocells of the photocell array may be changed to select at least two photocell select lines, and only photocells in a necessary area may be selected by selecting the photocell select lines.

In response to the control signal S-CON from the image processor 140, the switch circuit 112 selects by two {(OUT_0, OUT_1), (OUT_1, OUT_2) . . . (OUT_M−1, OUT_M)} of all the output lines OUT_0 to OUT_M opened by the line select signal. The photocell-line selection circuit 113 does not change the selected photocell lines SEL_0A and SEL_0B until the switch circuit 112 outputs the analog signals of the photocells of all the selected output lines OUT_0 to OUT_M.

In this case, the output lines OUT_0 to OUT_M are selected by the pre-filter rule in the switch circuit 112, as in the photocell-line selection circuit 113. Alternatively, they may be selected randomly or sequentially by the pre-filter rule. The pre-filter rule of the switch circuit 112 is determined by a designer's intension to select a comparative photocell. However, in an exemplary embodiment of the present invention, two output lines of adjacent photocells are selected for output. It will be easily appreciated that the pre-filter rule may be changed and at least two output lines of the photocell may be selected.

In the comparator circuit 130, the relative level comparator 131 receives and compares the two signals OUT_EVEN and OUT_ODD from the switch circuit 112 and outputs a 1-bit relative comparative output signal OUT_RE.

It will be easily appreciated that the pre-filter rule for the switch circuit 112 may be changed so that the switch circuit 112 may have at least two outputs and at least two relative level comparators 131 are provided. Specifically, it will also be easily appreciated that a value obtained by summing at least two outputs from the switch circuit 112 may be compared with a value from a designated specific photocell.

In the comparator circuit 130, the absolute level comparator 132 comprises one signal OUT_EVEN of the two signals output from the switch circuit 112 with the comparative signal (a voltage at a predetermined level) and outputs a 1-bit absolute comparative output signal OUT_ABS.

It will be easily appreciated that the absolute level comparator 132 may take the other output signal OUT_ODD of the switch circuit 112 as a comparative signal, and that the pre-filter rule of the switch circuit 112 may be changed so that the switch circuit 112 may have at least two outputs and at least two absolute level comparators 132 may be provided.

In the image processor 140, the motion data output unit 141 receives and stores the relative comparative output signal OUT_RE from the relative level comparator 131. The motion data output unit 141 stores outputs of all the photocells and forms the image of the object, compares the formed image with the stored previous object image, and calculates and outputs the motion data Vk.

The shutter control signal controller 142 of the image processor 140 receives and stores the absolute comparative output signal OUT_ABS from the absolute level comparator 132, calculates an average value of the stored data, and outputs the shutter control signal CSH for controlling the electronic shutter of the image sensor 110.

Figure 6:
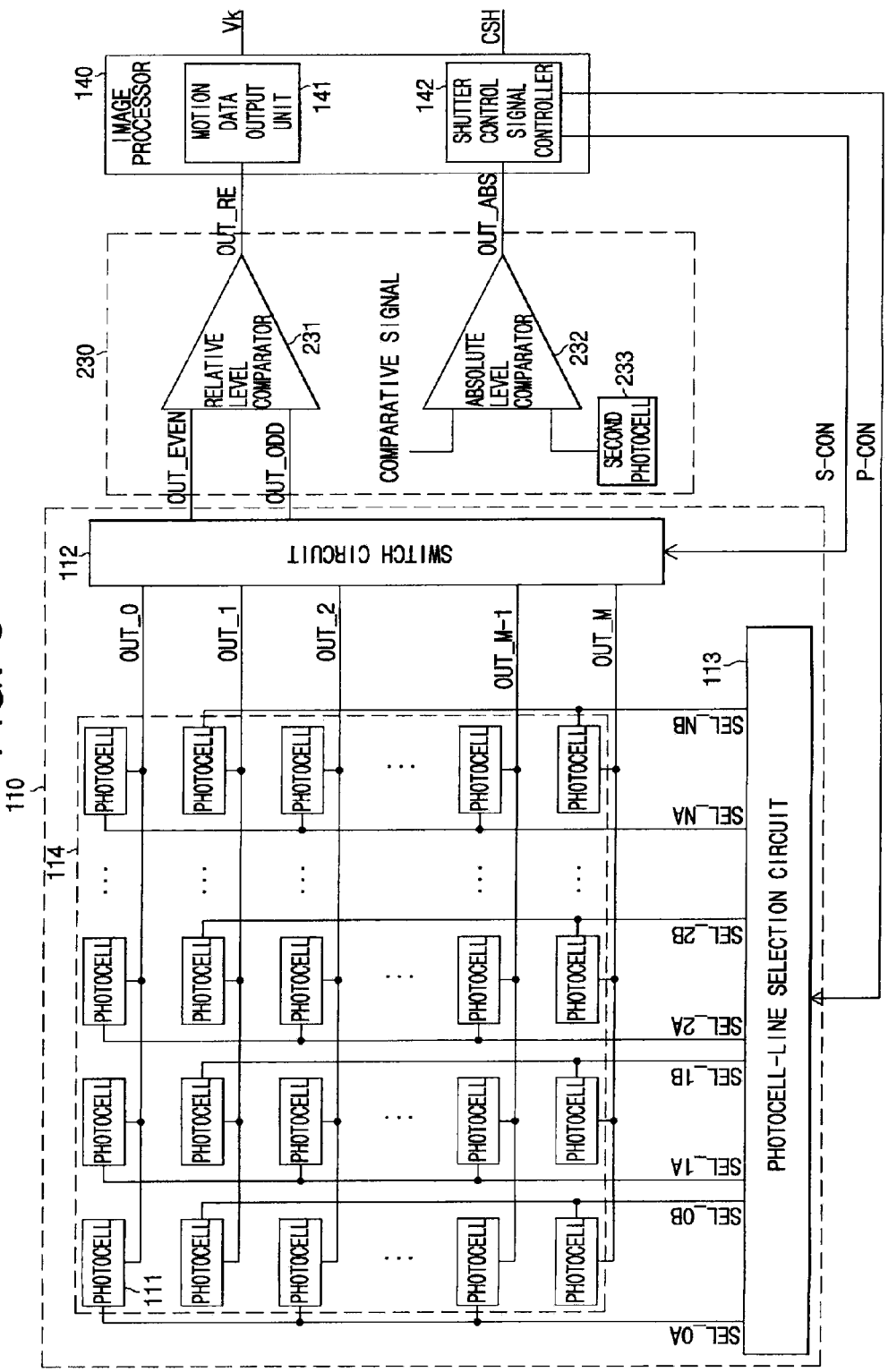
FIG. 6 illustrates an optical pointing device according to a second embodiment of the present invention.

FIG. 6 illustrates an optical pointing device according to a second embodiment of the present invention. The optical pointing device includes an image sensor 110, a comparator circuit 230, and an image processor 140.

Respective functions and operations of the blocks shown in FIG. 6 will now be described.

A description of the image sensor 110 and the image processor 140 having the same reference numbers as those shown in FIG. 5 will be omitted because they have the same configuration and perform the same operation as those shown in FIG. 5.

The comparator circuit 230 includes a relative level comparator 231 and an absolute level comparator 232. The relative level comparator 231 compares two signals OUT_EVEN and OUT_ODD output from the switch circuit 112 and outputs a 1-bit relative comparative output signal OUT_RE. The absolute level comparator 62 compares a comparative signal (i.e., a voltage at a predetermined level) with an output of a second photocell 233, and outputs an absolute comparative output signal OUT_ABS.

The second photocell 233 connected to the absolute level comparator 232 is separate from the image sensor 110 for controlling a shutter control. The second photocell 233 outputs a voltage level corresponding to an amount of input light. It will be easily appreciated that the pre-filter rule of the switch circuit 112 may be changed so that the switch circuit 112 has at least two outputs and at least two relative level comparators 231 are provided, and that at least two second photocells 233 and at least two absolute level comparators 232 may be provided.

The present invention does not include an A/D converter, or a pre-filter circuit for generating a 1-bit digital signal, thus reducing a chip size when the optical pointing device according to the present invention is implemented as a semiconductor device, unlike a conventional optical pointing device. Furthermore, the use of the second photocell 233 for shutter control can reduce input data computational complexity of the shutter control signal controller 142 in the image processor 140 for generating the shutter control signal, thus reducing current consumption in the image processor 140.

Figure 7:
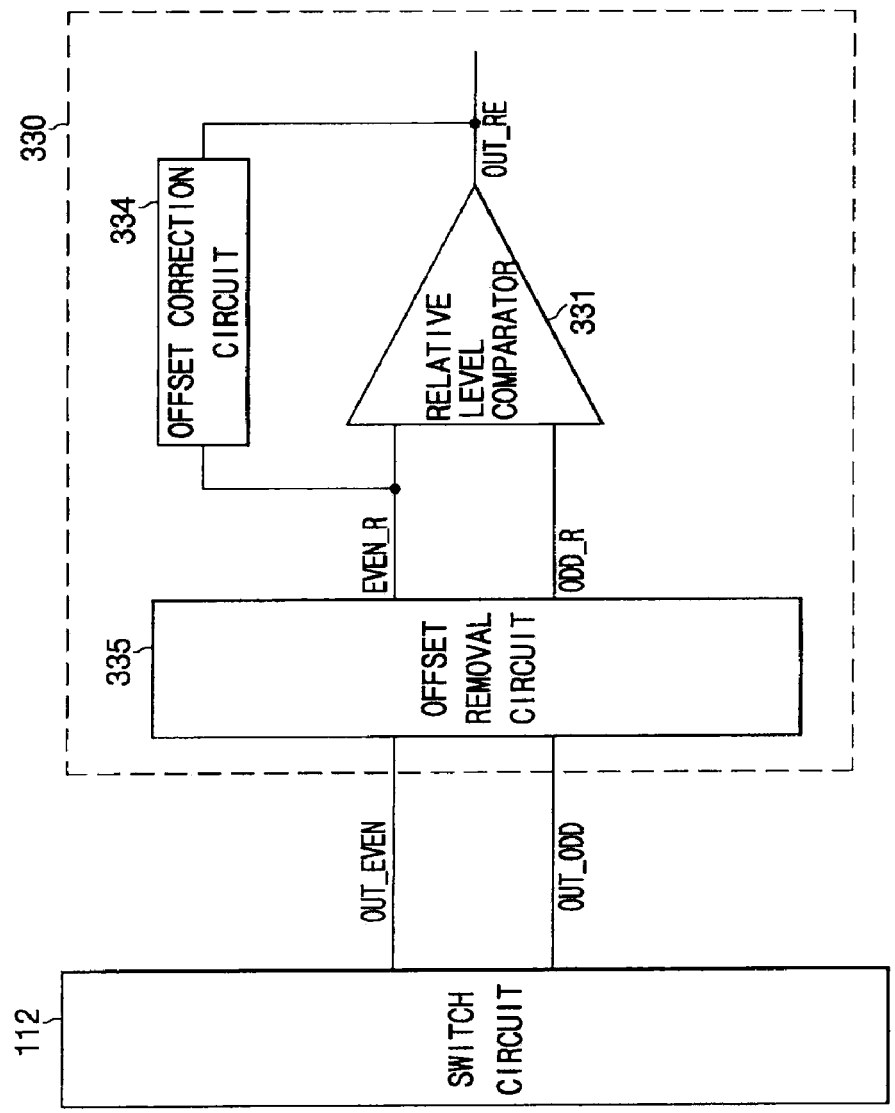
FIG. 7 is a block diagram of a relative level comparator having an offset removal circuit and an offset correction circuit according to the present invention.

FIG. 7 is a block diagram of a relative level comparator further having an offset removal circuit and an offset correction circuit according to the present invention. The relative level comparator includes a switch circuit 112, an offset removal circuit 335 and an offset correction circuit 334.

Respective functions of the blocks shown in FIG. 7 will now be described.

A description of the switch circuit 112 having the same reference number as that shown in FIG. 5 will be omitted because it has the same configuration and performs the same operation as that shown in FIG. 5.

The relative level comparison unit 330 includes a relative level comparator 331, the offset removal circuit 335, and the offset correction circuit 334.

The offset removal circuit 335 receives the signals OUT_EVEN and OUT_ODD from the switch circuit 112. The offset removal circuit 335 uses a correlated double sampling scheme, removes an offset of the input signals OUT_EVEN and OUT_ODD, and outputs signals EVEN_R and ODD_R having no offset.

In order to correct an offset of the relative level comparator 331, the relative level comparator 331 is connected to the offset correction circuit 334 using a switched-capacitor scheme. The relative level comparator 331 receives and compares the signals EVEN_R and ODD_R having no offset from the offset removal circuit 335, and outputs a 1-bit relative comparative output signal OUT_RE.

Figure 8A:
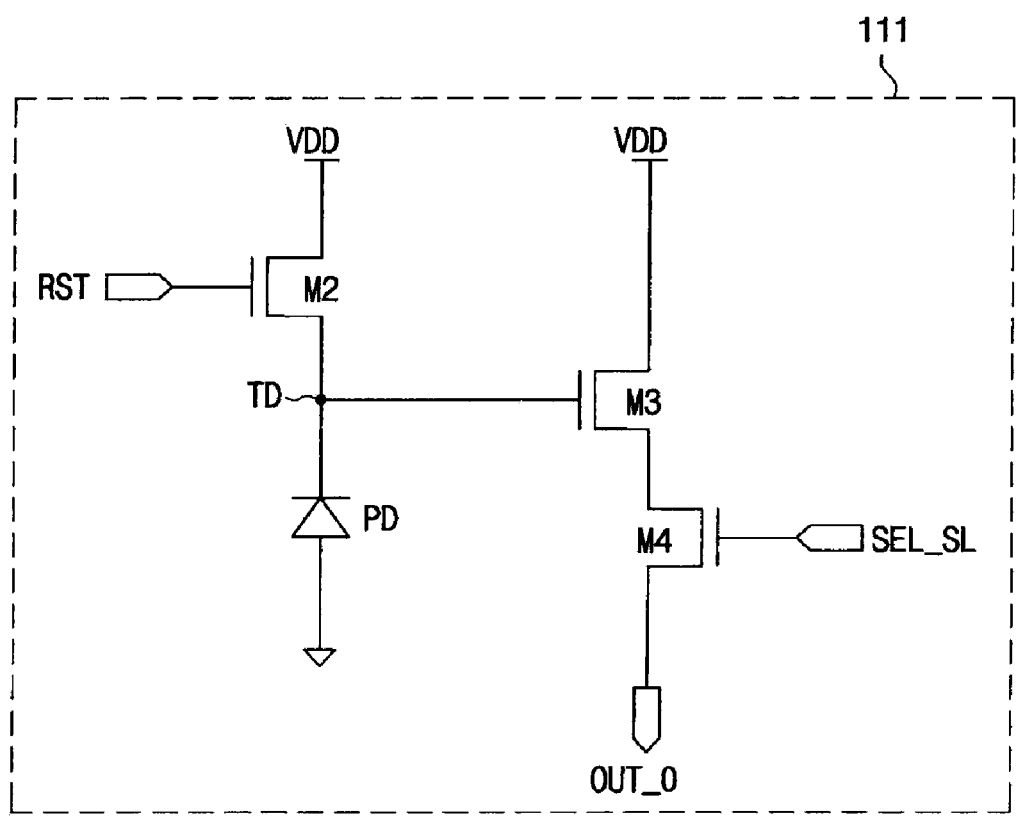
FIG. 8a is a circuit diagram of the photocell of FIG. 5.

FIG. 8a is a circuit diagram of the photocell of FIG. 5. The photocell 111 includes a plurality of NMOS transistors M2 to M4, and a photodiode PD.

Figure 8B:
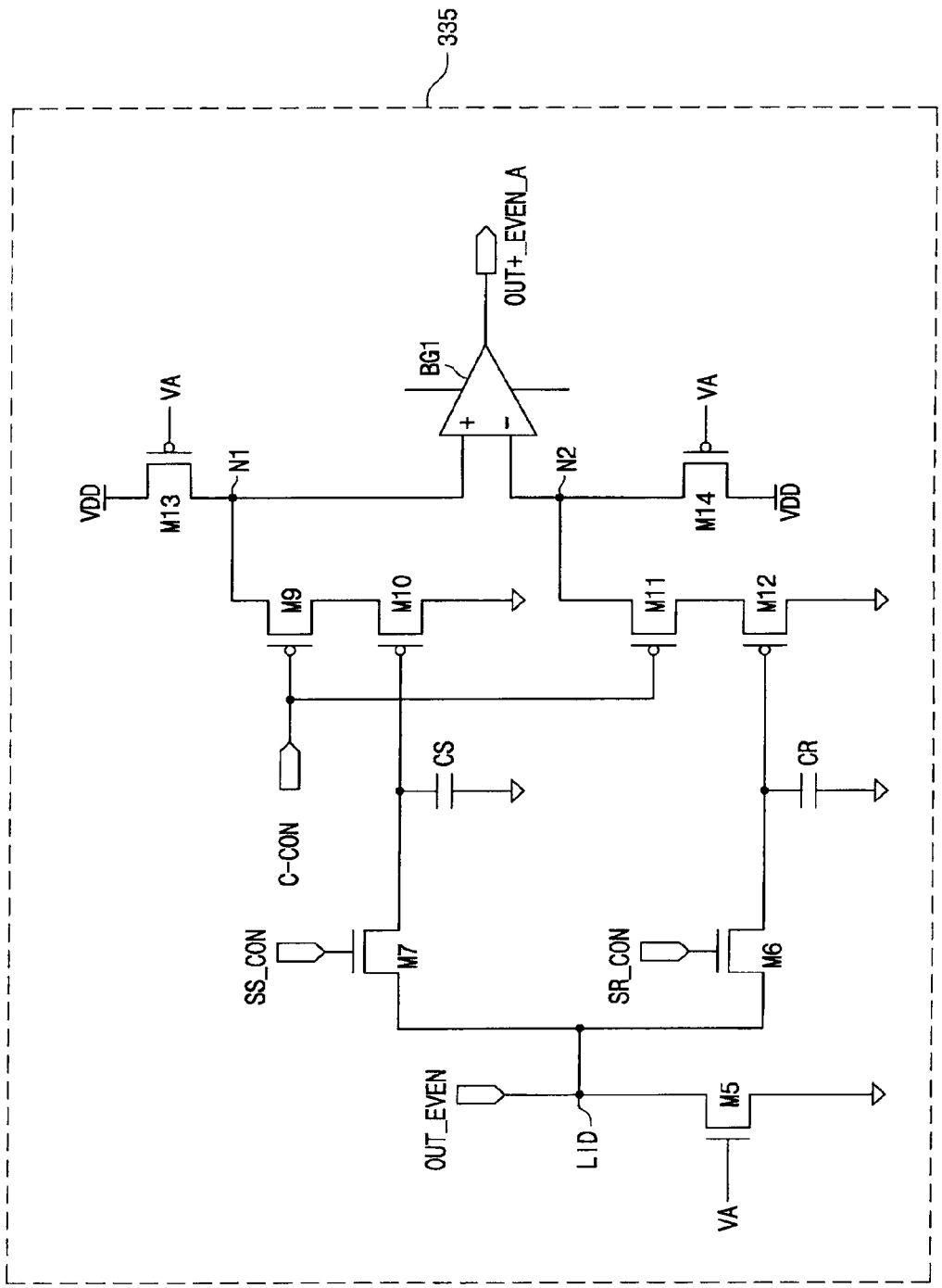
FIG. 8b illustrates an offset removal circuit of FIG. 7.

FIG. 8b illustrates an offset removal circuit using a correlated double sampling scheme. The offset removal circuit includes a plurality of NMOS transistors M5 to M7, a plurality of PMOS transistors M9 to M14, two capacitors CS and CR, and an operational amplifier BG1.

Operation of the photocell and the offset removal circuit will be described with reference to FIGS. 8a and 8b.

Upon initialization, when a reset signal RST at a "high" level is applied to a photocell 111, a reset voltage VR is generated on a node TD and the NMOS transistor M3 outputs a voltage corresponding to the reset voltage VR. When a select signal SEL_SL is applied at a "high" level, the NMOS transistor M4 is turned on and sends the voltage corresponding to the reset voltage VR to an output line OUT_0. The voltage on the output line OUT_0 is output to the input OUT_EVEN of the offset removal circuit 335 via the switch circuit 112. When the control signal SR_CON is on, the NMOS transistor M6 sends the input signal OUT_EVEN. Charges corresponding to the voltage of the input signal OUT_EVEN are accumulated in a capacitor CR. In this case, charges corresponding to the reset voltage VR plus the offset voltage Voff, i.e., the voltage VR+Voff are accumulated in the capacitor CR.

When the reset signal RST at a "low" level is applied and a shutter (not shown) turns on so that light is applied to the photodiode PD, the NMOS transistor M2 is turned off and current corresponding to the light applied to the photodiode PD flows. Accordingly, a signal voltage Vsig is generated on the node TD. When the select signal SEL_SL is generated at a "high" level, the NMOS transistor M3 outputs a voltage corresponding to the voltage on the node TD. And, the NMOS transistor M4 is turned on and sends the voltage corresponding to the voltage on the node TD to the output line OUT_0. The voltage on the output line OUT_0 is output to the input OUT_EVEN of the offset removal circuit 335 via the switch circuit 112. Thereafter, when the shutter is off and the control signal SS_CON at a "high" level is generated, the NMOS transistor M7 sends the input signal OUT_EVEN and charges corresponding to the voltage of the input signal OUT_EVEN are accumulated in the capacitor CS. In this case, charges corresponding to the signal voltage Vsig plus the offset voltage Voff, i.e., the voltages Vsig+Voff are accumulated in the capacitor CS. Thereafter, when the control signal C_CON at a "low" level is then applied, the PMOS transistors M9 and M11 are turned on, a voltage corresponding to the voltage Vsig+Voff applied to the PMOS transistor M10 is generated on the node N1 and a voltage corresponding to the voltage VR+Voff applied to the PMOS transistor M12 is generated on the node N2. The operational amplifier BG1 amplifies a difference value between the two voltages and generates an output OUT_EVEN_A having no offset voltage Voff. In this way, the output OUT_EVEN_A having no offset is generated by the offset removal circuit 335.

The foregoing description is based on the fact that the signal voltage includes the offset voltage generated by the transistor M3. The offset voltage exists in both the reset voltage and the signal voltage, and the output signal having no offset may be obtained by subtracting the reset signal including the offset voltage from the signal voltage including the offset voltage.

Figure 9:
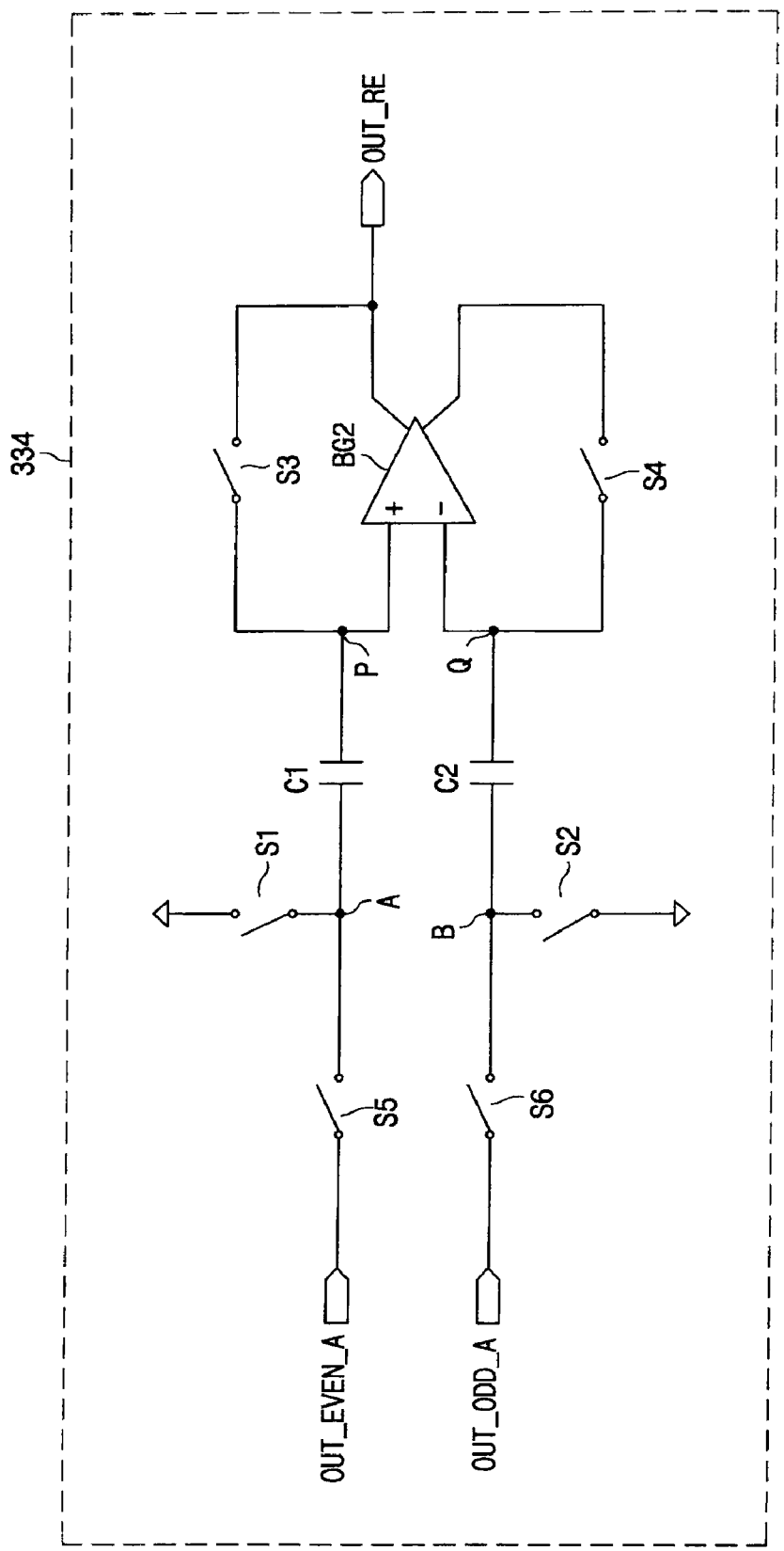
FIG. 9 illustrates an offset correction circuit of FIG. 7.

FIG. 9 illustrates an offset correction circuit using a switched-capacitor scheme. The offset correction circuit includes a plurality of switches S1 to S6, a plurality of capacitors C1 to C2, and a comparator BG2.

Operation of the offset correction circuit using a switched-capacitor scheme will now be described with reference to FIG. 9.

When the plurality of switches S5 and S6 of the offset correction circuit 334 are turned off and the plurality of switches S1 to S4 are turned on, a signal is not input. Accordingly, only an offset voltage Voff of the comparator BG2 is output and applied to nodes P and Q via the turned-on switches S3 and S4. The offset voltage Voff applied to the nodes P and Q is stored in the capacitors C1 and C2. In this state, when the plurality of switches S5 and S6 are turned on and the plurality of switches S1 to S4 are turned off, analog signals OUT_EVEN_A and OUT_ODD_A of the photocells are input to nodes A and B, and the analog signals OUT_EVEN_A and OUT_ODD_A plus the offset voltage Voff of the comparator stored in the capacitors C1 and C2, i.e., signals OUT_EVEN_A+Voff and OUT_ODD_A+Voff are generated at the nodes P and Q, respectively.

The comparator BG2 receives and compares the signal voltages OUT_EVEN_A+Voff and OUT_ODD_A+Voff on the nodes P and Q and outputs a relative comparative signal OUT_RE.

The input signals must be higher than the input offset voltage Voff so that the comparator compares the input signals and outputs the comparative signal. Thus, the offset correction circuit compares signals obtained by summing the offset voltage Voff of the comparator and the input signal and outputs the comparative signal, in which a capacitor is used for storing the offset voltage Voff of the comparator.

The offset removal circuit using the correlated double sampling scheme and the offset correction circuit using a switched-capacitor scheme remove or correct the offset. In the optical pointing device, the photocells of the image sensor have their offset, which causes a fixed-pattern noise, the percentage of which increases below a predetermined amount of the light, making optical pointing difficult. Moreover, when a circuit of the comparator is actually implemented, non-uniformity of the components causes an offset leading to a difference in an input signal in comparison operation of the comparator, causing malfunction of the device. The relative level comparator 331 including the offset removal circuit 335 and the offset correction circuit 334 resolves the above problem and allows acquisition of a high-quality image in an environment of a low signal-to-noise (S/N) ratio of an optical signal, such that the optical pointing device operates stably.

Thus, the optical pointing device according to the present invention does not include an A/D converter or a pre-filter circuit, thus reducing the area of the device and a chip size of a semiconductor integrated circuit, unlike a conventional optical pointing device.

Furthermore, the optical pointing device according to the present invention can obtain a high-quality image output and accordingly accurate motion data, by using the comparator having the offset removal and the offset correction circuit external to the image sensor in order to obtain motion data of an object. Also, the use of the second photocell separate from the image sensor can reduce data computational complexity of the image processor, thus reducing current consumption in the entire circuit, as well as the image processor.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. An optical pointing device comprising:
   an image sensor including a photocell array including a plurality of photocells for sensing light and generating an analog signal corresponding to the light, the image sensor sequentially outputting analog signals from the plurality of photocells in response to a first control signal and a second control signal;
   a comparator for comparing the signals output from the image sensor to generate a relative comparative signal, and comparing at least one signal output from the image sensor with a comparative signal to generate an absolute comparative signal; and
   a controller for outputting motion data using the relative comparative signal, outputting a shutter control signal using the absolute comparative signal and outputting the first control signal and the second control signal,
   wherein the controller comprises:
   a motion data output unit for receiving the relative comparative signal, and calculating and outputting motion data; and
   a shutter control signal controller for receiving the absolute comparative signal, calculating an average value of the signal, and outputting a shutter control signal.

2. The device of claim 1, wherein the image sensor comprises:
   the plurality of photocells arranged in a first direction and a second direction;
   a photocell-line selection circuit for selecting the plurality of photocells arranged in the first direction in response to the first control signal; and
   a switch circuit for selecting and outputting analog signals output from the plurality of photocells selected by the photocell-line selection circuit in response to the second control signal.

3. The device of claim 2, wherein the comparator comprises:
   at least one first comparator for comparing at least two analog signals output from the switch circuit and outputting the relative comparative signal; and
   at least one second comparator for comparing at least one analog signal output from the switch circuit with the comparative signal and outputting the absolute comparative signal.

4. The device of claim 3, wherein the comparator further comprises:
   an offset correction circuit for correcting an offset of the first comparator itself; and
   an offset removal circuit for removing an offset of the signal output from the switch circuit.

5. The device of claim 4, wherein the offset correction circuit comprises an offset correction circuit using a switched-capacitor scheme to perform offset correction.

6. The device of claim 4, wherein the offset removal circuit comprises an offset removal circuit using a correlated double sampling scheme to remove the offset.

7. An optical pointing device comprising:
an image sensor including a photocell array including a plurality of first photocells for sensing light and generating an analog signal corresponding to the light, the image sensor sequentially outputting analog signals output from the plurality of first photocells in response to a first control signal and a second control signal;
at least one second photocell for sensing light and generating an analog signal corresponding to the light;
a comparator for comparing the signals output from the image sensor to generate a relative comparative signal and comparing the signal output from the second photocell with a comparative signal to generate an absolute comparative signal; and
a controller for outputting motion data using the relative comparative output signal, outputting a shutter control signal using the absolute comparative output signal and outputting the first control signal and the second control signal,
wherein the controller comprises:
a motion data output unit for receiving the relative comparative signal, and calculating and outputting motion data; and
a shutter control signal controller for receiving the absolute comparative signal, calculating an average value of the signal, and outputting a shutter control signal.

8. The device of claim 7, wherein the image sensor comprises:
the plurality of photocells arranged in a first direction and a second direction;
a photocell-line selection circuit for selecting the plurality of photocells arranged in the first direction in response to the first control signal; and
a switch circuit for selecting and outputting analog signals output from the plurality of photocells selected by the photocell-line selection circuit in response to the second control signal.

9. The device of claim 8, wherein the comparator comprises:
at least one first comparator for comparing at least two analog signals output from the switch circuit and outputting the relative comparative signal; and
at least one second comparator for comparing the analog signal output from the second photocell with the comparative signal and outputting the absolute comparative signal.

10. The device of claim 9, wherein the comparator further comprises:
an offset correction circuit for correcting an offset of the first comparator itself; and
an offset removal circuit for removing an offset of the analog signal output from the switch circuit.

11. The device of claim 10, wherein the offset correction circuit comprises an offset correction circuit using a switched-capacitor scheme to perform offset correction.

12. The device of claim 10, wherein the offset removal circuit comprises an offset removal circuit using a correlated double sampling scheme to remove the offset.

* * * * *